US007383992B2

(12) United States Patent
Le (10) Patent No.: US 7,383,992 B2
(45) Date of Patent: Jun. 10, 2008

(54) MEMORY CARD WITH HOST INTERFACE AND INCLUDING INTERNAL INTERFACE FOR RECEIVING MICRO-SIZE MEMORY CARDS

(75) Inventor: Trung V. Le, White Bear Township, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 11/545,951

(22) Filed: Oct. 10, 2006

(65) Prior Publication Data

US 2008/0083828 A1 Apr. 10, 2008

(51) Int. Cl.
*G06K 7/06* (2006.01)
(52) U.S. Cl. ............... 235/441; 235/439; 235/492; 361/737; 361/785; 439/76.1; 439/630
(58) Field of Classification Search ............. 235/439, 235/441, 492; 361/737, 785; 439/76.1, 439/630
See application file for complete search history.

(56) References Cited

U.S. PATENT DOCUMENTS

| | | | | |
|---|---|---|---|---|
| 6,813,164 | B2* | 11/2004 | Yen | 361/785 |
| 6,890,188 | B1* | 5/2005 | Le | 439/76.1 |
| 6,908,038 | B1* | 6/2005 | Le | 235/492 |
| 7,104,809 | B1* | 9/2006 | Huang | 439/76.1 |
| 7,152,801 | B2* | 12/2006 | Cuellar et al. | 235/492 |
| 2002/0174337 | A1* | 11/2002 | Aihara | 713/172 |
| 2003/0212848 | A1* | 11/2003 | Liu et al. | 710/305 |
| 2003/0221066 | A1* | 11/2003 | Kaneko | 711/115 |
| 2005/0037647 | A1* | 2/2005 | Le | 439/131 |
| 2005/0204086 | A1 | 9/2005 | Le et al. | |
| 2006/0026348 | A1* | 2/2006 | Wallace et al. | 711/115 |
| 2006/0069814 | A1* | 3/2006 | Abraham et al. | 710/8 |

OTHER PUBLICATIONS

SanDisk miniSD™ Adapter, 2006 SanDisk Corporation, 1 page.

* cited by examiner

*Primary Examiner*—Michael G. Lee
*Assistant Examiner*—Ali Sharifzada
(74) *Attorney, Agent, or Firm*—Eric D. Levinson (57) ABSTRACT

The invention is directed to a device that functions as an adaptor for a micro-memory card. The device includes a port to receive the micro-memory card and an internal interface within the port allows for electrical connection between the device and the micro-memory card. The device also includes a card interface that conforms to a standard sized memory card. The device can be inserted into another device that accepts such standard sized memory card so that the other device can store data onto the micro-memory card connected to the port. In addition, the device also includes a host interface, such as an external shieldless USB tab protruding from an edge of the device, or a wireless USB interface to allow for wireless USB communication.

12 Claims, 5 Drawing Sheets

MEMORY CARD WITH HOST INTERFACE AND INCLUDING INTERNAL INTERFACE FOR RECEIVING MICRO-SIZE MEMORY CARDS

TECHNICAL FIELD

The invention relates to removable storage media devices and, in particular, removable memory cards.

BACKGROUND

A wide variety of removable storage media exist for use with voice recorders, digital video camcorders, digital cameras, personal digital assistants (PDAs), cellular phones, video games, digital televisions, photo printers, and the like. The removable storage media allow users to capture and store data on such devices, and easily transport the data between these devices and host computers.

One of the most popular types of removable storage media is the flash memory card, which is compact, easy to use, and has no moving parts. A flash memory card includes an internal, high-speed, solid-state memory capable of persistently storing data without application of power. Numerous other types of memory can also be used in memory cards, including electrically-erasable-programmable-read-only-memory (EEPROM), non-volatile random-access-memory (NVRAM), and other non-volatile or volatile memory types, such as synchronous dynamic random-access-memory (SDRAM), with battery backup.

A wide variety of memory cards have been recently introduced, each having different capacities, access speeds, formats, interfaces, and connectors. Examples of memory cards include CompactFlash™ (CF) first introduced by SanDisk™ Corporation, the Memory Stick™ (MS) and subsequent versions including Memory Stick Pro and Memory Stick Duo developed by Sony Corporation, Smart Media™ memory cards, Secure Digital (SD) memory cards, and MultiMedia Cards (MMCs) jointly developed by SanDisk Corporation and Siemens AG/Infineon Technologies AG, and xD™ digital memory cards developed by Fuji. Many other memory card standards continue to emerge and evolve.

Each of the different memory cards typically has an external interface, which defines the electrical and mechanical connection interfaces of the card. Each different memory card generally requires a specialized adapter or reader for use with a host computing device. The adapter or reader includes an internal interface that conforms to the external interface of the memory card. In addition, the adapter or reader also includes an external interface that can be accepted by a host computer. Thus, the adaptor or reader includes both an internal interface to receive a memory card and an external interface to connect to a host computer. The internal interface of the adaptor or reader may comply with a memory card standard, and the external interface may comply with a host standard. Examples of host standards include personal computer memory card international association (PCMCIA) standards such as the 16 bit standard PC Card standard and the 32 bit CardBus standard, the Universal Serial Bus (USB) standard, the Universal Serial Bus 2 (USB2) standard, the IEEE 1394 FireWire standard, the Small Computer System Standard (SCSI) standard, the Advance Technology Attachment (ATA) standard, the serial ATA standard, the Peripheral Component Interconnect (PCI) standard, the PCI Express standard, a serial or parallel standard, or the like.

More recently, memory card form factors have become significantly smaller. Such "small" memory cards are commonly referred to as "mini" memory cards or "micro" memory cards. In this disclosure, micro-memory cards are defined as any memory card whose dimensions (both length and width) are less than 22 millimeters. Many of the memory card standards listed above now produce corresponding "micro" versions of the respective cards. In particular, current micro-memory cards include miniSD, microSD, MMCmicro and MSmicro to name a few. These micro-memory cards may be accepted by some devices that include micro-sized ports, which are sized for the micro-memory cards. However, other devices that accept the conventionally-sized versions of the respective cards may require a micro-memory card adaptor to read the micro-memory cards.

SUMMARY

The invention is directed to a device that functions as a dual adaptor for a micro-memory card. The device includes an internal electrical interface formed within a port of the device, and a micro-memory card can be inserted into the port to couple to the internal electrical interface. The device includes at least two other interfaces that allow communication with either another device or a host computer. In this manner, the device functions as a versatile adaptor for the micro-memory card to allow the micro-memory card to be read by devices that otherwise accept standard sized memory cards or a host computer that has a host computer interface.

The device described herein may have dimensions similar to a conventional standard memory card, and in some cases may itself include internal memory. Other devices designed to receive a standard memory card can use the device as an adaptor to read micro-memory cards. Alternatively, host computers can use the device to read the micro-memory card by coupling to a host interface on the device.

In one embodiment, the invention provides a device comprising a housing, a first external interface on the housing, wherein the first external interface conforms to a memory card standard, a second external interface on the housing, wherein the second external interface conforms to a host connector standard, and an internal interface in the housing that conforms to a micro-memory card standard.

In another embodiment, the invention provides a device comprising a housing, an external interface on the housing, wherein the external interface conforms to a memory card standard, a wireless host interface within the housing, wherein the wireless host interface allows wireless communication between the device and a host computer, and an internal interface in the housing that conforms to a micro-memory card standard.

In another embodiment, the invention provides a method comprising inserting a micro-memory card into an adaptor device that includes a device interface and a host interface, inserting the adaptor device into another device to couple the device interface to the other device, storing information from the other device to the micro-memory card, removing the adaptor device with the micro-memory card from the other device, connecting the adaptor device to a host computer via the host interface, and accessing the information from the micro-memory card via the host computer.

Embodiments of the invention may provide one or more advantages. In particular, the adaptor device described herein provides versatility to read micro-memory cards in devices that otherwise accept standard sized memory cards or in host computers that have a host computer interface. Rather than needing a conventional adaptor device to read a micro-memory card in a legacy device that supports larger standard memory cards and a micro-memory card reader to read the micro-memory card in a host computer, the adaptor device described herein can provide dual functionally that allows such micro-memory cards to be read by legacy devices or host computers.

The details of one or more embodiments of the invention are set forth in the accompanying drawings and the description below. Other features, objects, and advantages of the invention will be apparent from the description and drawings, and from the claims.

DETAILED DESCRIPTION

The invention is directed to a device that functions as an adaptor for a micro-memory card. The device includes a port to receive the micro-memory card and an internal interface within the port allows for electrical connection between the device and the micro-memory card. The device also includes a card interface that conforms to a standard-sized memory card interface. The device can be inserted into another device that accepts standard-sized memory cards so that the other device can store data onto the micro-memory card connected to the port. In addition, the device also includes a host interface, such as an external shieldless USB tab protruding from an edge of the device, or a wireless USB interface to allow for wireless USB communication. In either case, the host interface allows the device to connect to a host computer so that the host computer can read or write data to the micro-memory card. In this manner, the device provides versatility, allowing access to the micro-memory card via other devices that support the standard "legacy" card formats or host computers that includes host interfaces, such as a USB interface.

Figure 1:
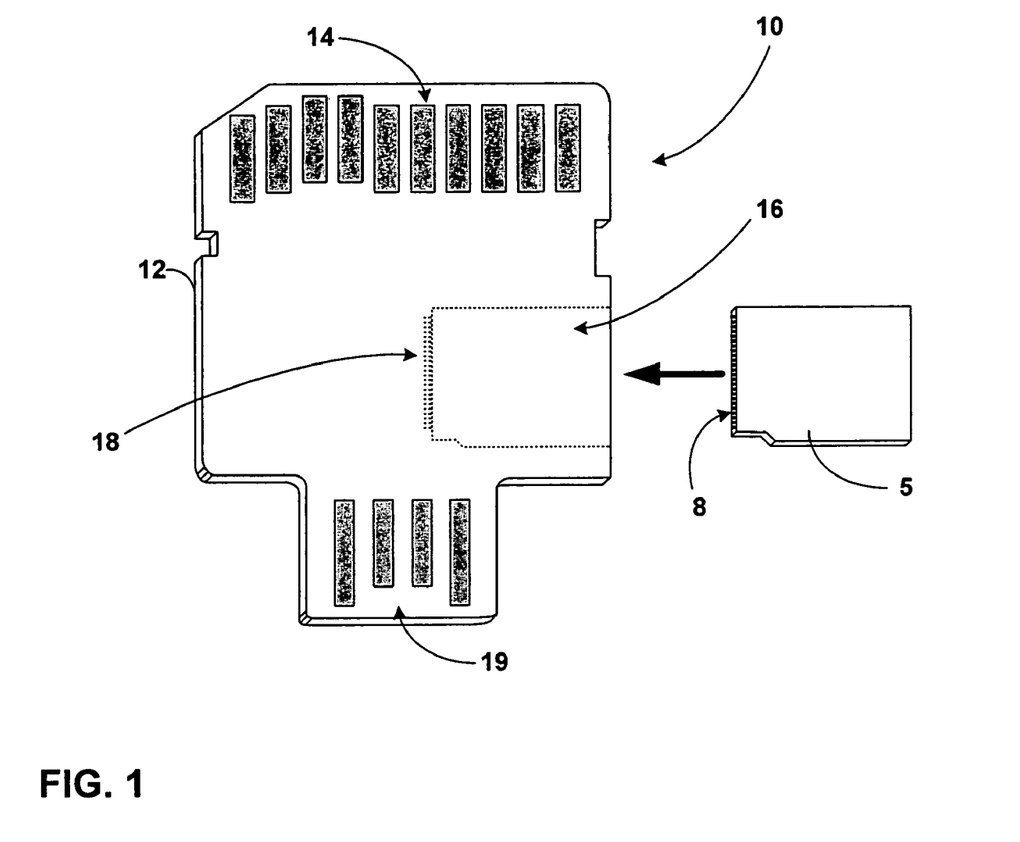
FIG. 1 is a perspective view of an exemplary device that can function as a dual adaptor for a micro-memory card according to an embodiment of the invention.

FIG. 1 is perspective diagram of a device 10 that can receive a micro-memory card 5 and function as an adaptor for micro-memory card 5. In this disclosure, micro-memory cards are defined as any memory card whose major dimensions (both length and width) are less than 22 millimeters. Many of the memory card standards listed above currently have "micro" versions of the respective cards. In particular, current micro-memory cards include miniSD, microSD, MMCmicro and MSmicro to name a few. These micro-memory cards include memory and a controller within the respective housings, and are very similar to "standard" memory cards, yet assume smaller form factors. In this disclosure, "standard" memory cards are defined as memory cards having at least one dimension larger than 22 millimeters. Examples of standard memory cards include compact flash (CF), Memory Stick™ (MS), Memory Stick Pro, Memory Stick Duo, Secure Digital (SD), MultiMedia Cards (MMCs) and xD™ although many other memory cards that fall within the definitions above may also exist.

Device 10 may essentially conform to a standard memory card format. In particular, housing 12 of device 10 may define dimensions that conform to a standard memory card format. The width and thickness of housing 12, for example, may correspond to that of a standard memory card, thereby allowing device 10 to be received by a device in the same manner that a standard memory card is received. The length of housing 12 (including host interface 19) may also conform to that of the memory card standard. In some cases, device 10 may itself be a memory card that includes internal memory and a controller for such memory. In any case, device 10 includes an external interface 14 that conforms to a standard memory card format. External interface 14 is formed on housing 12 and may include electrical contacts that conform to the memory card standard and allow device 10 to be electrically coupled to any other device designed to receive memory cards of that standard format. Thus, external interface 14 may be viewed as an external connector that can be received by a port that complies with the memory card standard associated with external interface 14.

Device 10 also includes a port 16 that is formed in housing 12, and port 16 is designed to receive a micro-memory card 5. In particular, the dimensions of port 16 are such that micro-memory card 5 can be inserted at least partially into device 10. The width and thickness of port 16, for example, may substantially correspond to that of micro-memory card 5. The length of port 16, in some cases, may also be long enough to fully receive micro-memory card 5, which is desirable if device 10 is to be fully inserted into another device. When micro-memory card 5 is inserted into port 16, the electrical contacts 8 of micro-memory card 5 electrically couple with those of internal interface 18 within port 16 of device 10. Internal interface 18 may comprise a plurality of electrical connectors, pins, or the like, formed within port 16. Following insertion of micro-memory card 5 into port 16, device 10 may itself be inserted into a standard memory card port of another device to allow the other device access to memory within micro-memory card 5.

Device 10 also includes a host interface 19, which is formed on housing 12. In the illustration of FIG. 1, host interface 19 is an external interface in the form of a shieldless USB tab. However, other types of host interfaces for other host connector standards are also contemplated by this disclosure. In general, host interface 19 may be viewed as an external connector that can be received by a port of a host computer. The port of the host computer may comply with the host connector standard associated with host interface 19.

Moreover, in some cases discussed below, the external host interface 19 could be replaced with a wireless host interface. In the illustration of FIG. 1, however, host interface 19 is external to housing 12 and includes electrical contacts that conform to the USB standard. Accordingly, host interface 19 can be inserted into a corresponding port of a host computer to allow access to micro-memory card 5 when micro-memory card 5 is within port 16 of device 10. In this way, device 10 allows other devices such as voice recorders, digital video camcorders, digital cameras, personal digital assistants (PDAs), cellular phones, video games, digital televisions, photo printers, and the like, to access micro-memory card 5 via external interface 14, and also allows host computers to access micro-memory card 5 via host interface 19. This provides versatility insofar as device 10 facilitates access to micro-memory card 5 via devices that support standard card formats, or host computers that include host connectors that correspond to host interface 19.

In the illustrated example of FIG. 1, external interfaces 14 and 19 are formed on opposing sides of device 10, while internal interface 18 is formed within port 16 on a side adjacent the opposing sides associated with external interfaces 14 and 19. This layout achieves efficiency that enables the three interface designs, with external interfaces 14 and 19 on opposing sides and an internal interface 18 formed on the adjacent side relative to the opposing sides. Other layouts, however, may also be used. In some cases, micro-memory card 5 is inserted into port 16 prior to device 10 being inserted into another device or a host computer. However, in other cases, device 10 may be inserted into another device or a host computer prior to micro-memory card 5 being inserted into port 16. Thus, the invention is not limited to any order in which the different devices may be connected.

Figure 2:
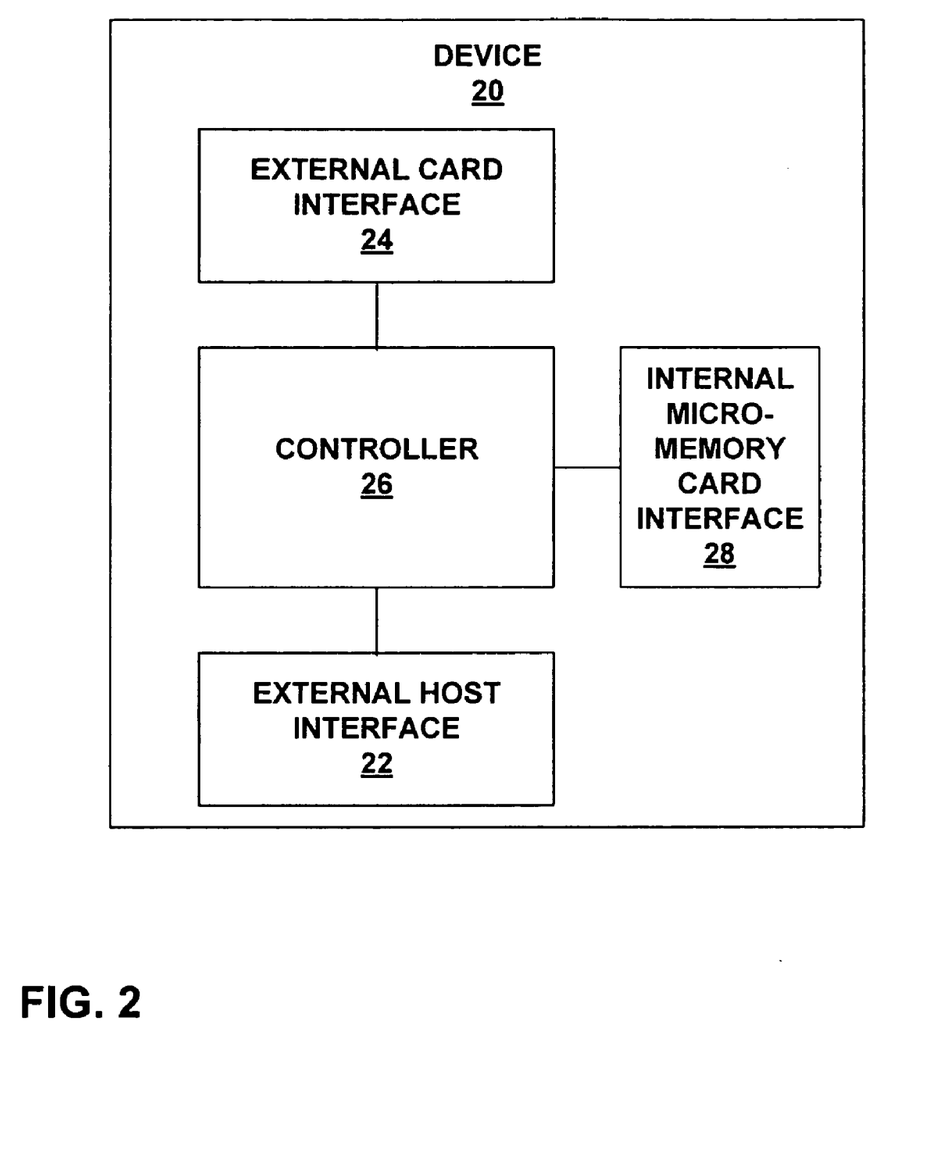
FIGS. 2-4 are block diagrams illustrating exemplary devices according to embodiments of the invention.

FIG. 2 is a block diagram illustrating one exemplary architectural embodiment of a device 20, which may correspond to device 10 of FIG. 1. Device 20 includes two external interfaces. In particular, device 20 includes an external host interface 22 and an external card interface 24. External host interface 22 comprises a set of electrical contacts that conform to a host connector standard, such as USB, USB-2, firewire, or the like. External card interface 24 comprises a set of electrical contacts that conform to memory card standard associated with "standard" sized memory cards, such as SD, MMC, MS, xD, or the like.

Device 20 also includes an internal micro-memory card interface 28. In particular, internal micro-memory card interface 28 is formed within device 20 such that upon insertion of a micro-memory card into device 20, the micro-memory card couples to device 20 via internal micro-memory card interface 28. Internal micro-memory card interface 28 may conform to memory card standard associated with "micro" sized memory cards, such as miniSD, microSD, MMCmicro, MSmicro or the like.

Controller 26 is a unified controller that controls external interfaces 22 and 24, as well as internal interface 28. However, separate controllers could also be used. The use of one unified controller 26 may be more efficient than using separate controllers for each interface. Device 20 provides versatility by achieving dual adaptor functionality for devices that comply with a standard memory card format and host computers designed to receive external connectors of a host computer format.

Figure 3:
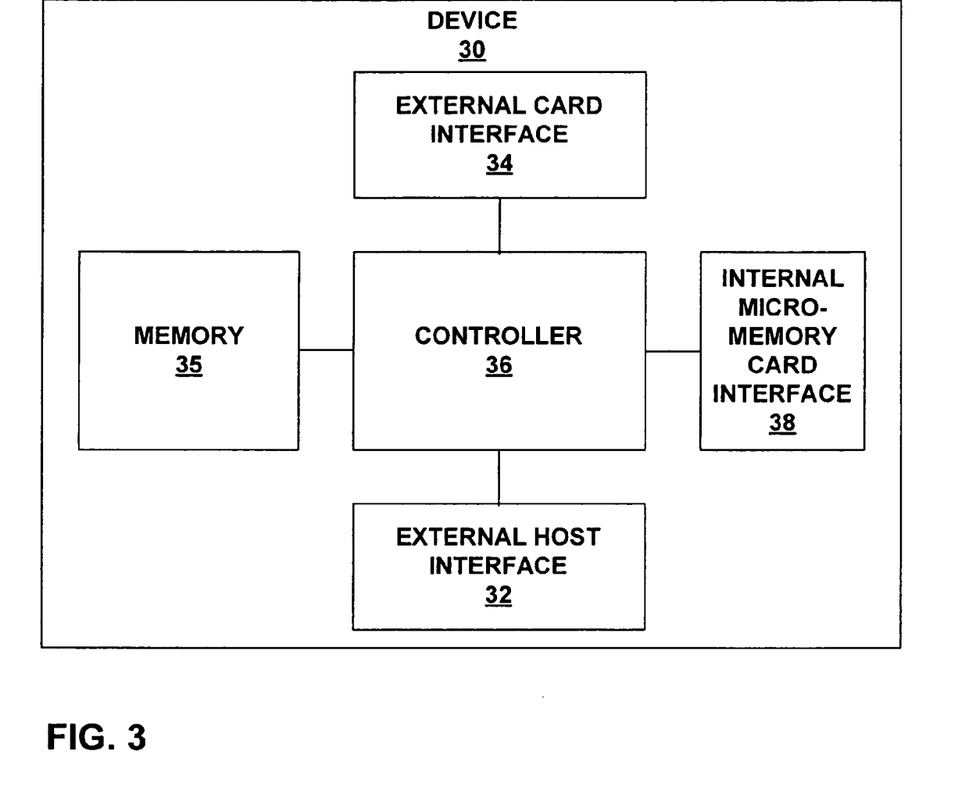

FIG. 3 is another block diagram illustrating an exemplary architectural embodiment of a device 30, which may correspond to device 10 of FIG. 1. The architecture of device 30 is generally similar to that of device 20. In particular, device 30 includes an external host interface 32, an external card interface 34, an internal micro-memory card interface 38, and a unified controller 36. However, unlike device 20, device 30 also includes memory 35. In this manner, device 30 is itself a memory card even when a micro-memory card is not attached.

Controller 36 may control access to memory 35. In some cases, storage tasks can be duplicated to memory 35 and the memory of a micro-memory card attached to device 30, for redundant storage to device 30 and the micro-memory card attached to device 30. In other cases, controller 36 may identify and partition the different memories (memory 35 and memory of a micro-memory card attached to device 30) so that a user can determine where the data should be stored. External devices and host computers can access such memories by using device 30 as an adaptor for the micro-memory card inserted into device 30 and the permanent memory 35 within device 30. Memory 35 may comprise FLASH memory or any other memory useful for memory cards.

In one embodiment, device 30 may comprise a memory card with host and card interfaces 32 and 34, and expandable memory capabilities. For example, memory 35 may comprise permanent memory space for device 30. Then, following insertion of a micro-memory card into internal micro-memory card interface 38, the overall memory of device 30 may be expanded. If memory 35 is a 2 gigabyte memory and another 2 gigabyte micro-memory card is inserted into interface 38, for example, the overall memory of device 30 may be expanded from 2 gigabytes to 4 gigabytes.

Figure 4:
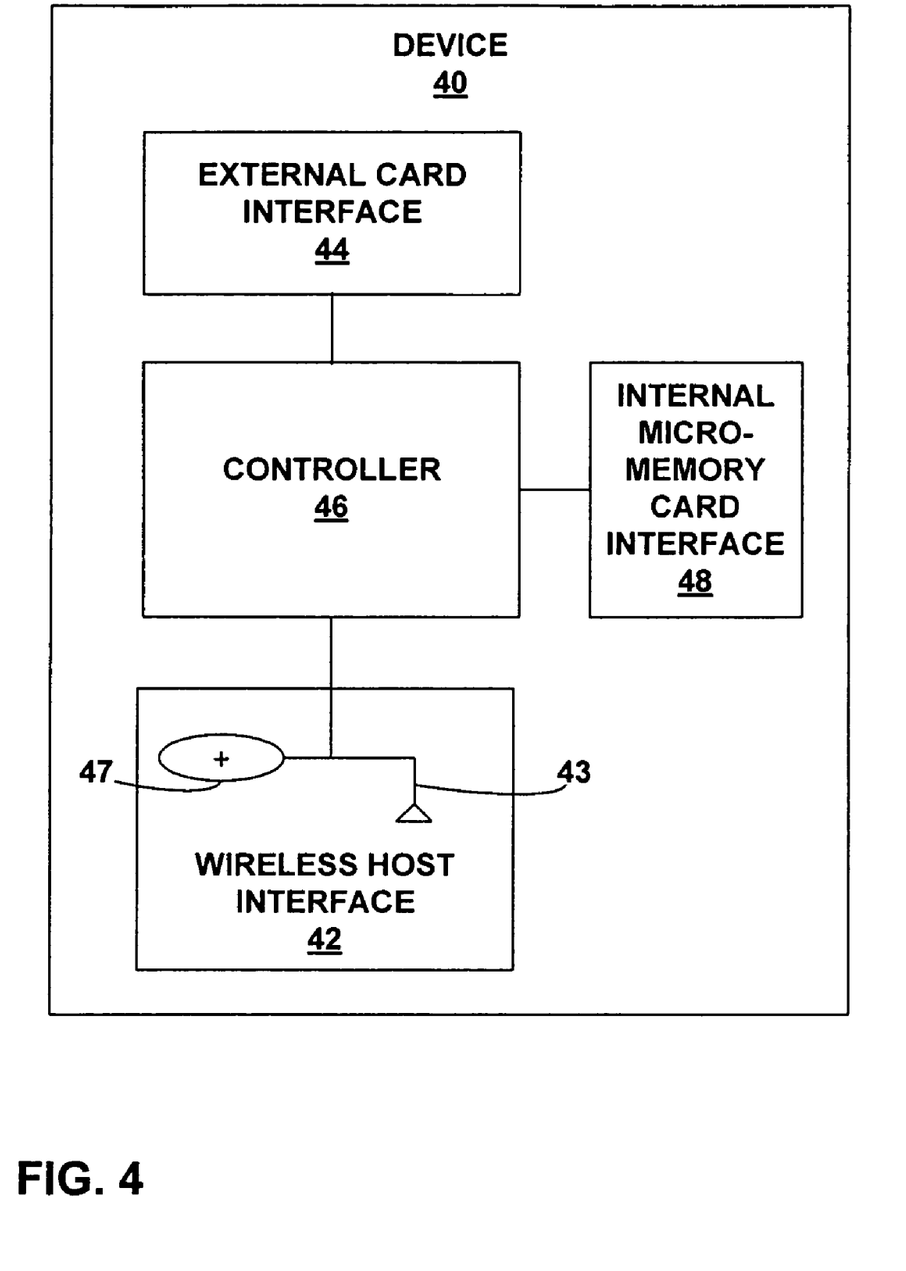

FIG. 4 is yet another block diagram illustrating an exemplary architectural embodiment of a device 40, which may be similar to device 10 of FIG. 1. Unlike device 10, however, device 40 includes a wireless host interface 42 rather than an external host interface. Wireless host interface 42 can facilitate wireless communication with a host computer, e.g., via a local networking wireless standard or the like. Wireless host interface 42 may include an antenna 43 and a power source 47 to facilitate such wireless communication. Wireless host interface 42, for example, may facilitate wireless communication according to a wireless USB standard, the Zigbee standard, or the like.

Like devices 20 and 30 of FIGS. 2 and 3, device 40 of FIG. 4 includes an external card interface 44, an internal micro-memory card interface 48, and a unified controller 46. Controller 46 controls communication with a micro-memory card via internal micro-memory card interface 28, controls communication with another device that supports standard memory cards via external card interface 44, and controls wireless communication with a host computer via wireless host interface 42.

Figure 5:
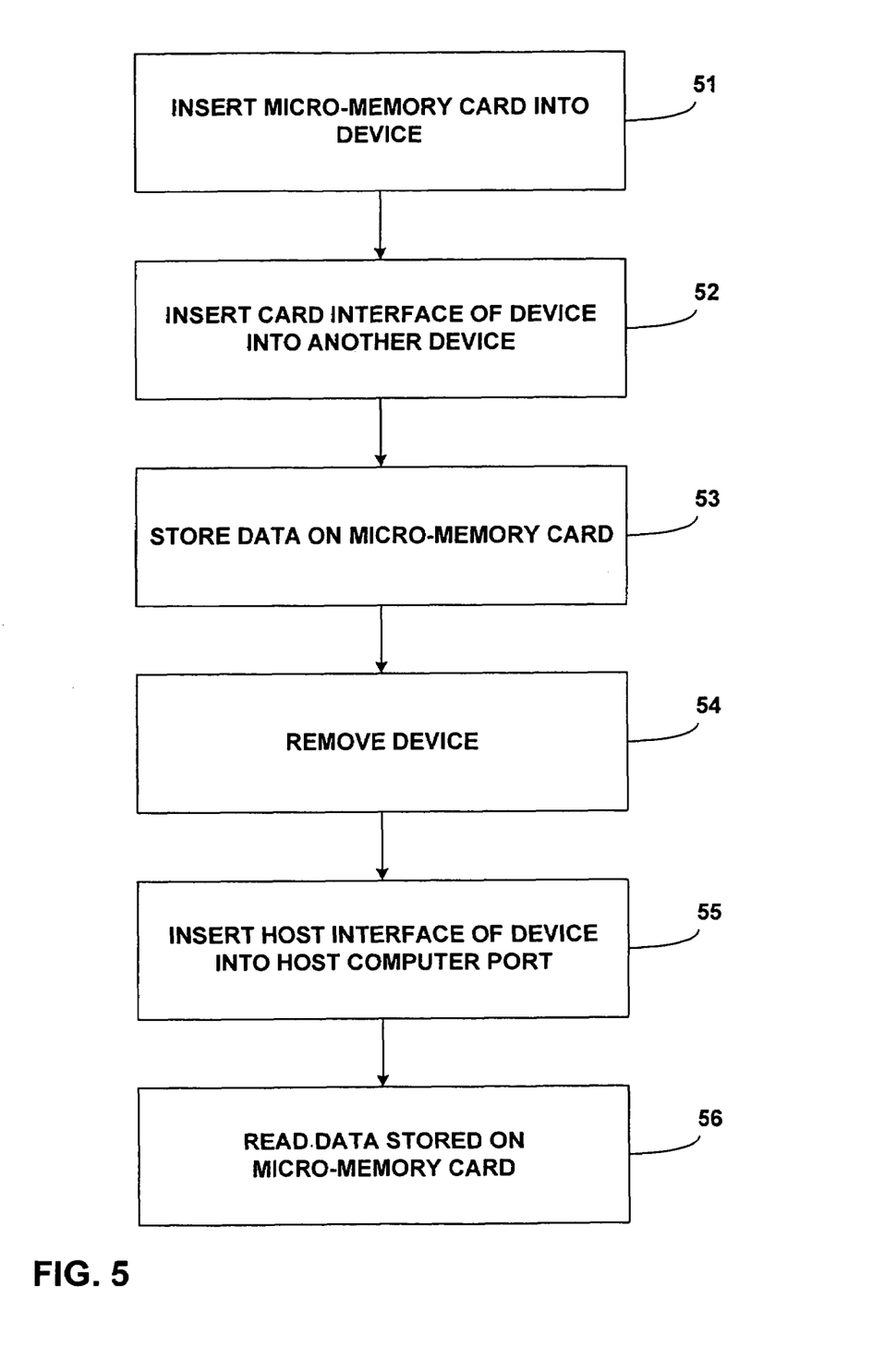
FIG. 5 is a flow diagram illustrating a method of use of one of the devices described herein.

FIG. 5 is a flow diagram illustrating a method of use of the devices described herein. By way of example, FIG. 5 will be described with reference to FIG. 1. As shown in FIG. 5, a user inserts micro-memory card 5 into device 10 (51). In particular, micro-memory card 5 is inserted into port 16 so that electrical contacts 8 electrically couple with the corresponding electrical contacts of internal interface 18 within housing 12 of device 10. Interface 14, which is an external card interface that corresponds to a memory card standard, is then inserted into a corresponding port of another device (52). This other device can then store data on the micro-memory card 5 (53). Device 10 acts as an adaptor for micro-memory card 5 to allow this other device to access micro-memory card 5 and store data thereon.

Device 10 can then be removed from the other device, once the desired data is stored from the other device to micro-memory card 5 (54). At any time, micro-memory card 5 may be removed from device 10, and used in devices that conform to the micro-memory card standard. According to the invention, device 10 can also be used as a host adaptor for micro-memory card 5. In this case, interface 19, which is an external host computer interface that corresponds to a host connector standard, is inserted into a corresponding port of a host computer (55). The host computer can then read data from micro-memory card 5 (56), or possibly write other data to micro-memory card 5 (56). Accordingly, device 10 acts as a dual adaptor for micro-memory card 5 to allow access to micro-memory card 5 by devices that support a memory card standard associated with interface 14 or by host computers or devices that support a host computer connector standard associated with interface 19. If host interface 19 is replaced with a wireless interface, of course, the technique of FIG. 5 would be modified to use wireless communication with the host computer rather than physical connection to interface 19.

A number of embodiments of the invention have been described. In particular, a versatile adaptor device for micro-sized memory cards has been described. The adaptor device may itself include permanent memory in some cases. The adaptor device can receive a micro-memory card, and can attach to either a standard memory card port or a host computer port. The adaptor device includes two different external connectors to facilitate dual access by either a device that supports the standard memory card port or a host computer. In an alternative embodiment, the external host computer interface of the device may be replaced with a wireless interface. Although several standards have been listed for exemplary memory card standards and exemplary host standards, other standards could be supported without departing from the scope of the following claims. Accordingly, these and other embodiments are within the scope of the following claims.

The invention claimed is:

1. A memory card device comprising:
   a housing;
   a permanent memory within the housing;
   a first external interface on the housing, wherein the first external interface conforms to a memory card standard;
   a second external interface on the housing, wherein the second external interface conforms to a host connector standard;
   an internal interface in the housing that conforms to a micro-memory card standard, wherein a micro-memory card can be inserted into the internal interface, read by another device when the first external interface is connected to the other device, and read by a host computer when the second external interface is connected to the host computer, and wherein the permanent memory within the housing can be read by the other device via the first external interface and read by the host device via the second external interface even when the micro-memory card is not inserted into the internal interface; and
   a controller that controls the first external interface, the second external interface, the internal interface, and access to the permanent memory, wherein when the micro-memory card is inserted into the internal interface, the controller partitions the permanent memory and a memory of the micro-memory card so that a user can determine where data should be stored.

2. The device of claim 1, wherein the micro-memory card standard defines dimensions of a micro-memory card, wherein the dimensions include a length and a width both less than 22 millimeters, and wherein the internal interface is formed within a port of the device, wherein the port conforms to the width of the micro-memory card such that the micro-memory card can be inserted at least partially into the port.

3. The device of claim 1, wherein the host connection standard comprises one of a personal computer memory card international association (PCMCIA) standard, a PC Card standard, a CardBus standard, a Universal Serial Bus (USB) standard, a Universal Serial Bus 2 (USB2) standard, an IEEE 1394 FireWire standard, a Small Computer System Interface (SCSI) standard, an Advance Technology Attachment (ATA) standard, a serial ATA standard, a Peripheral Component Interconnect (PCI) standard, and a PCI Express standard.

4. The device of claim 1, wherein the second external, connector comprises a shieldless tab and the internal connector comprises a set of electrical contacts within a port formed on the housing.

5. The device of claim 1, wherein the device defines dimensions that correspond to dimensions of a memory card standard.

6. The device of claim 1, wherein the first and second external interfaces are formed on opposing sides of the device and the internal interface is formed on a side adjacent to each of the opposing sides.

7. A memory card device comprising:
   a housing;
   a permanent memory within the housing;
   an external interface on the housing, wherein the external interface conforms to a memory card standard;
   a wireless host interface within the housing, wherein the wireless host interface allows wireless communication between the device and a host computer;
   an internal interface in the housing that conforms to a micro-memory card standard, wherein a micro-memory card can be inserted into the internal interface, read by another device when the external interface is connected to the other device, and read by a host computer when the wireless host interface is wirelessly connected to the host computer, and wherein the permanent memory within the housing can be read by the other device via the first external interface and read by the host device via the second external interface even when the micro-memory card is not inserted into the internal interface; and
   a controller that controls the external interface, the wireless host interface, the internal interface, and access to the permanent memory, wherein when the micro-memory card is inserted into the internal interface, the controller partitions the permanent memory and a memory of the micro-memory card so that a user can determine where data should be stored.

8. The device of claim 7, wherein the micro-memory card standard defines dimensions of a micro-memory card, wherein the dimensions include length and width less than 22 millimeters, and wherein the internal interface is formed within a port of the device, wherein the port conforms to the width such that the micro-memory card can be inserted at least partially into the port.

9. The device of claim 7, wherein the device defines dimensions that correspond to dimensions of a memory card standard.

10. A method comprising:
    inserting a micro-memory card into a port of a memory card, wherein the memory card includes a housing, the port for the micro-memory card formed in the housing, a permanent memory within the housing, a device interface and a host interface;
    inserting the memory card into another device to couple the device interface to the other device;
    storing first information from the other device to the micro-memory card that is inserted into the port of the memory card;
    storing second information from the other device to the permanent memory within the housing of the memory card;
    removing the memory card with the micro-memory card from the other device;
    connecting the memory card to a host computer via the host interface;
    accessing the first information from the micro-memory card via the host computer; and
    accessing the second information from the permanent memory within the housing of the memory card via the host computer, wherein a controller partitions the permanent memory and a memory of the micro-memory card so that a user can determine where data should be stored.

11. The method of claim 10, wherein the device interface comprises a first external interface that conforms to a memory card standard and the host interface comprises a second external interface that conforms to a host connector standard.

12. The method of claim 10, wherein the device interface comprises an external interface that conforms to a memory card standard and the host interface comprises a wireless host interface that conforms to a wireless host connector standard.

* * * * *